Sept. 19, 1967

N. R. HENRY 3,342,010

APPARATUS FOR AND METHOD OF FILLING AND SEALING CUPS

Filed Sept. 18, 1963

INVENTOR.
Nelson R. Henry
BY
Newton, Hopkins & Jones
ATTORNEYS

INVENTOR.
Nelson R. Henry
BY
Newton, Hopkins & Jones
ATTORNEYS

INVENTOR.
Nelson R. Henry
BY
Newton, Hopkins & Jones
ATTORNEYS

Sept. 19, 1967  N. R. HENRY  3,342,010
APPARATUS FOR AND METHOD OF FILLING AND SEALING CUPS
Filed Sept. 18, 1963  6 Sheets-Sheet 5

INVENTOR.
Nelson R. Henry
BY
Newton, Hopkins & Jones
ATTORNEYS

Sept. 19, 1967 N. R. HENRY 3,342,010
APPARATUS FOR AND METHOD OF FILLING AND SEALING CUPS
Filed Sept. 18, 1963 6 Sheets-Sheet 6

INVENTOR.
Nelson R. Henry
BY
Newton, Hopkins & Jones
ATTORNEYS

United States Patent Office 3,342,010
Patented Sept. 19, 1967

3,342,010
APPARATUS FOR AND METHOD OF FILLING
AND SEALING CUPS
Nelson R. Henry, Decatur, Ga., assignor to Sav Oil, Inc.,
Atlanta, Ga., a corporation of Georgia
Filed Sept. 18, 1963, Ser. No. 309,831
6 Claims. (Cl. 53—37)

This invention relates to an apparatus for and method of automatically filling and sealing cups and is more particularly concerned with an apparatus for and method of automatically positioning cups in trays on a conveyor, filling the cups as they are conveyed and wherein the cups, after being filled, are closed by a film of heat sealable material, the film being, thereafter sealed and cut longitudinally and transversely so as to separate the film into rectangular portions corresponding to the cups.

In the past cups containing individual servings of various jellies, jams, condiments, mayonnaise, syrup and other pourable materials have been extensively used. These cups have usually been filled automatically one at a time utilizing machinery which, after filling the cup, places a cap on the cup and discharges the cup to a conveyor where the cup is thereafter collected and inserted on a tray and a plurality of such trays stacked into a box. The prior art machine has quite a number of disadvantages, among which is the slow speed at which the cups are filled and closed. Furthermore, the prior art machine requires a number of workmen operating in conjunction with the machine to place the cups in the trays, each cup requiring manual handling. The prior art machine, also, often discharges the liquid into areas other than the cups, thereby creating a mess which impedes the efficiency of the machine. Each cup, being discharged from the machine, must be inspected in order to ascertain whether the cap which is inserted over the top of the cup is properly seated.

Briefly, the present invention, which obviates the difficulties described above, includes a conveyor carried by a frame for conveying trays having recesses for receiving cups along a predetermined path. The conveyor operates intermittently so as to stop each transverse row of recesses below a cup magazine which drops cups into the recesses in the tray. Thereafter, the tray is transported to a filling zone where liquid is fed to the cups. The conveyor, then, passes the cups beneath a sheet of heat sealable material which is continuously layed over the procession of cups and sealed by heat and pressure. Next, this sheet is slit longitudinally and, thereafter, cut transversely while leaving the trays uncut so as to separate the sheet into individual rectangular portions which respectively close the cups.

The process of the present invention includes the various steps described above, irrespective of the machinery employed.

Accordingly, it is an object of the present invention to provide an apparatus and process of filling and sealing cups which is quick and efficient in operation and requires little attention.

Another object of the present invention is to provide an apparatus for and process for automatically filling cups with a liquid and thereafter hermetically sealing the cups.

Another object of the present invention is to provide an apparatus for automatically sealing and filling cups, the apparatus being inexpensive to manufacture, and durable in structure.

Another object of the present invention is to provide an apparatus and process wherein cups are automatically installed and sealed, without the necessity of removing the cups from the trays and without the necessity of individually handling or otherwise touching the cups.

Another object of the present invention is to provide an apparatus and process for filling cups wherein the absence of a cup at a filling zone will cause no shut down of the machinery and no messy discharge of liquid to an undesired area.

Other objects, features and advantages of the present invention will become apparent in the following description when taken in conjunction with the accompanying drawings wherein like characters of references designate corresponding parts throughout the several views and wherein.

Figure 1:
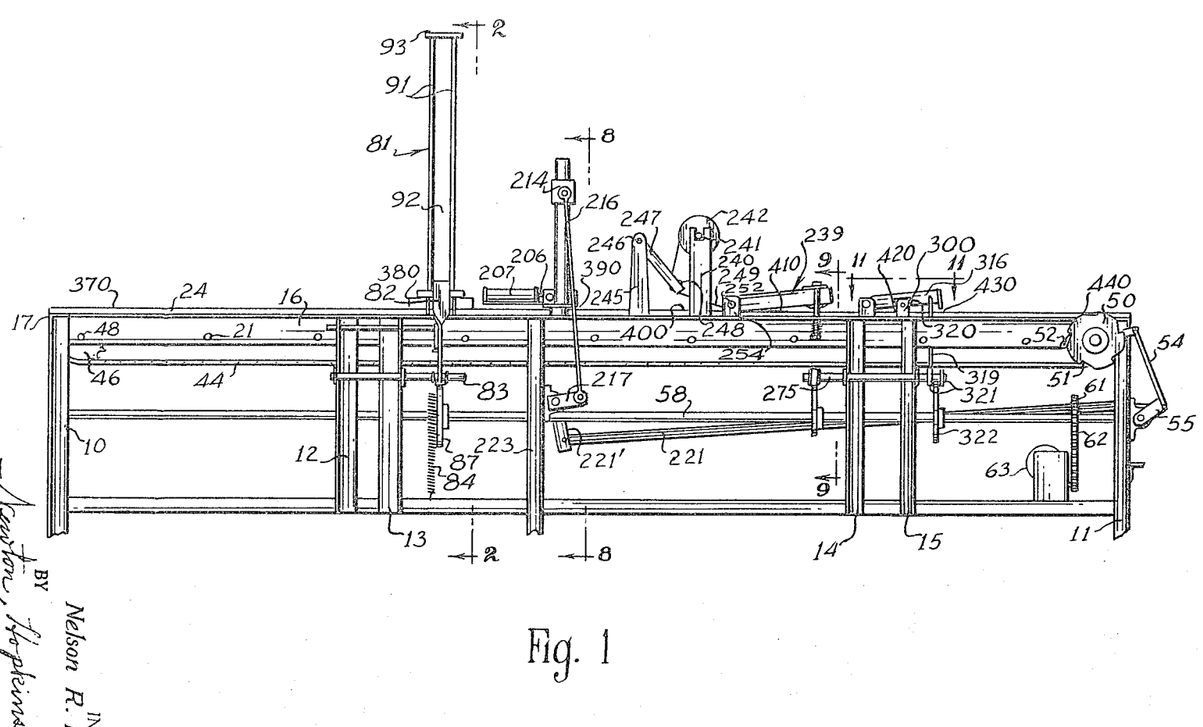
FIG. 1 is a fragmentary side elevational view of a machine constructed in accordance with the present invention.

Referring now in detail to the embodiment chosen for the purpose of illustrating the present invention, the frame of the present invention includes a pair of upright, front or entrance end, legs 10 and a pair of upright, or exit end, legs 11, between which are a plurality of intermediate uprights 12, 13, 14 and 15, and an intermediate leg 223 seen in FIG. 1. Across the tops of these legs 10, 11, 223 and uprights 12, 13, 14 and 15 is a horizontal rectangular top frame including opposed parallel longitudinally extending side beams 16 and transversely extending end beams 17 and 18; below the beams 16 are respectively a pair of bottom beams 19 reinforced by transverse beams such as beam 20 in FIG. 2.

The beams 16, 19 and 20 are angle irons, the flanges of each beam 16 protruding respectively outwardly and downwardly to provide horizontal flanges of beams 16 in the same horizontal plane and opposed vertically disposed flanges parallel to each other.

Intermediate the ends of the beams 16 are a plurality of spaced transversely extending tie bars 21 which project through appropriate holes in the vertical flanges of beams 16. These tie bars 21 also project through holes in a median, longitudinally extending, chain guide bar 22 and a pair of parallel longitudinal tray support bars 23, equally spaced on opposite sides of the median guide bar 22. Spacer sleeves 27 on the tie bars 21 maintain the proper spacing for bars 22 and 23, the bars 23 being spaced inwardly of the beams 16.

Respectively outwardly of the tray support bars 23 are a pair of longitudinally extending tray guide bars 24 which are angle irons, one flange of each angle iron projecting outwardly and the other flanges of each projecting upwardly. Straps 25, extending outwardly from the outwardly extending flanges of guide bars 24, are provided with elongated slots 25′ through which bolts 26 project to threadedly engage the outwardly protruding flanges of beams 16. By loosening bolts 26, the transverse distance between the guide bars 24 may be varied to accommodate, therebetween the trays 28.

Figure 16:
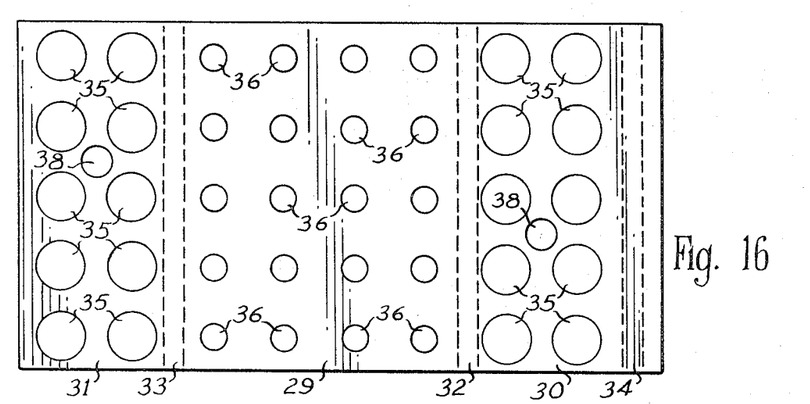
FIG. 16 is a plan view of a fiber board blank suitable for forming the tray which operates in conjunction with the machine of the present invention.
Figures 17, 18:
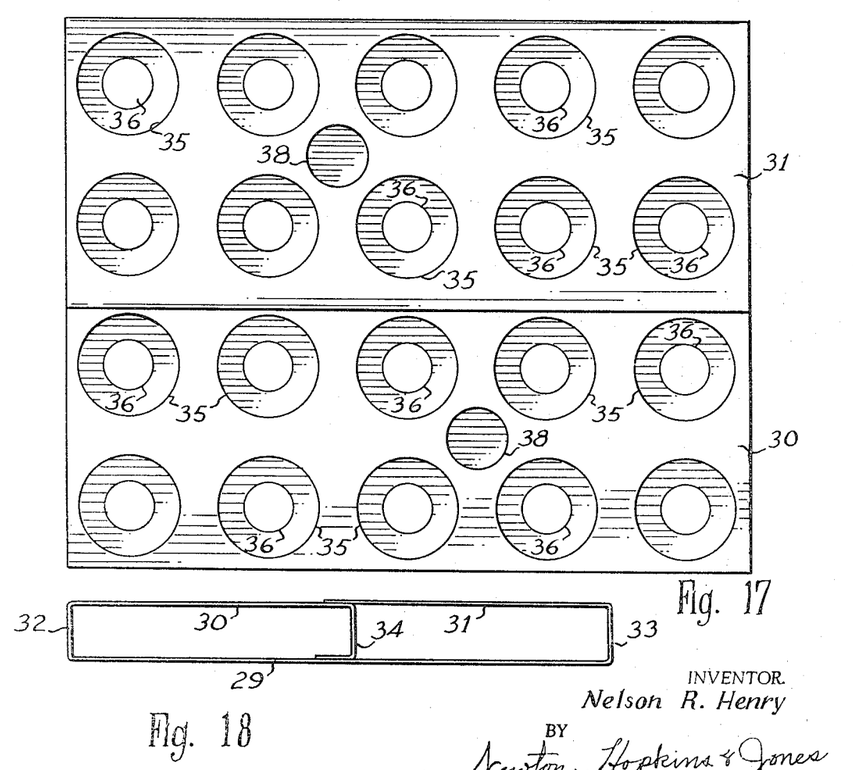
FIG. 17 is a top plan view of the tray produced from the blank shown in FIG. 16.
FIG. 18 is an end view of one end of the tray shown in FIG. 17.

Departing briefly from the mechanism of the cup filling and sealing apparatus, in FIGS. 17 and 18 the tray 28 is illustrated. The fibre board tray 28 is formed from a rectangular blank shown in FIG. 16 which is cut and scored to provide a bottom sheet 29, sides 32 and 33 on opposite sides of sheet 29, top sheets 30 and 31 extending from the sides 32 and 33 and a rib 34 attached to one edge of top sheet 30.

When the tray 28 is assembled, the rib 34 is adhered to the central portion of the bottom sheet 29, and is bent to form the top sheet 30, the top sheet 30 being folded downwardly at its outer edge to form the side 32. The side 32 is integral with the bottom sheet 29 and the bottom sheet 29 is turned upwardly beyond the rib 34 to form the side 33 which is disposed parallel to the side 32, the rib 34 being disposed approximately midway between and parallel to the sides 32 and 33. The top sheet 31 extends from the upper edge of side 33 inwardly so as to overlap a portion of the top sheet 30, adjacent rib 34, where glue or other adhesive, or the like, adheres the end of the top sheet 31 to the surface of the top sheet 30.

A plurality of relatively large holes 35 are provided in the top sheets 30 and 31 the holes 35 being aligned transversely and longitudinally of the tray 28. A plurality of small holes 36 are provided in the bottom sheet 29 so that when the tray is in its righted position, the holes 35 are in register and are concentric with the holes 36. Diagonally opposed finger holes 38 provide a means by which the tray 28 may be lifted.

The holes 35 are of a diameter sufficient to form recesses which accommodate the frustoconical side walls or sides 42 of the cups 40, which are seen in FIGS. 6, 7, 8, 12 and 13. These cups 40, however, are sufficiently large that, when placed in the tray 28, they cannot pass through the holes 36, the bottoms 41 of the cups 40 resting upon the bottom sheet 29 of the tray 28 as the downwardly tapered side walls 42 of the cups 40 are confined by the edges of the upper sheets 30 and 31 which define the holes of 35. As received in the tray 28, each tubular cup 40 sits upright with its bottom 41 resting on bottom sheet 29, and has an open upper end, the side wall 42 extending above the upper surface of tray 28 as defined by the top sheets 30 and 31, so that the annular lip or rim 43 of each cup 40 is spaced above the surface defined by the top sheets 30 and 31. The lip or rim 43 is annular and of uniform thickness, protrudes outwardly of the upper end of side wall 42 and has a flat upper surface.

For moving the conveying chain 44 in its circular path, there are a pair of sprockets 46 and 47 disposed inwardly adjacent the entrance and exit ends of the frame. Sprockets 46 and 47 are carried by sprocket shafts 48 and 49 respectively, these shafts being appropriately journaled in the beams 16. The sprocket 46 constitutes an idler sprocket around which one end portion of the chain 44 extends while the sprocket 47 constitutes a drive sprocket around which the other end of the chain 44 extends.

The shaft 49 is driven intermittently by means of a pawl and ratchet mechanism, including a ratchet wheel 50 having five notches 51 circumferentially equally spaced along its periphery. Each of the notches 51 gradually opens in one direction and forms a radial shoulder in the other direction. The notches 51 are adapted to receive a pawl 52 which is carried by one end of a lever 53, the central portion of lever 53 being carried for rotation by the shaft 49, inwardly of the wheel 50. The outer end of lever 53 is pivotally connected to a pitman 54 which, in turn, is pivotally connected by its other end to a crank arm 55 fixed for rotation on the end of a shaft 56.

Figure 14:
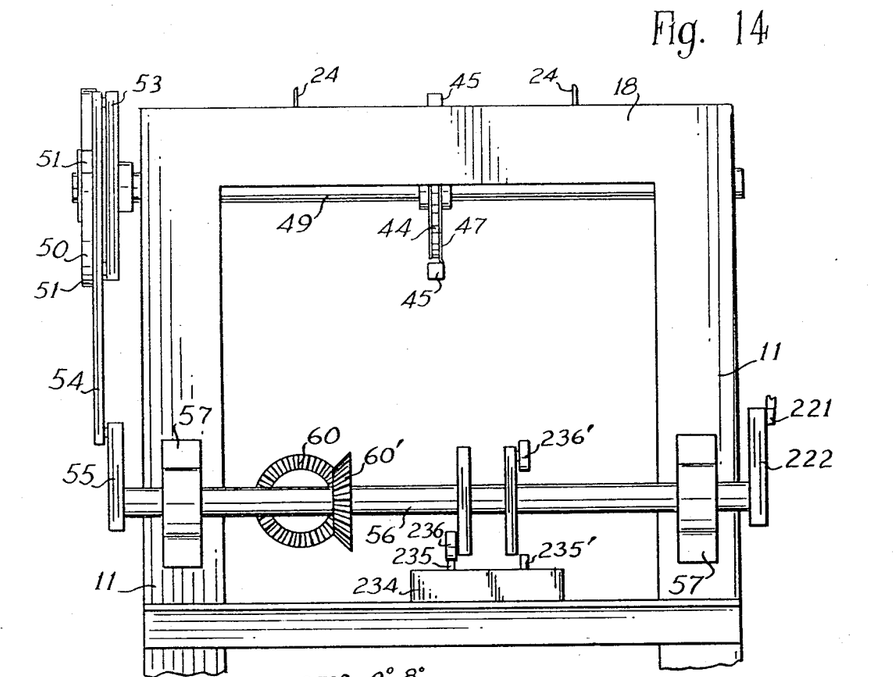
FIG. 14 is an end view of one end of the machine shown in FIG. 1, the background elements being deleted from the drawing for purpose of clarity.

As seen in FIG. 14 the shaft 56 is disposed below end beam 18 and is journaled for rotation by a pair of brackets 57 extending from approximately the mid portion of the exit end legs 11. As the shaft 56 is rotated, the crank arm 55 imparts a reciprocatory motion to the pitman 54 which rocks the lever 53 back and forth through an arc in excess of 72° so as to move the pawl 52 in an arcuate path in excess of the arcuate distance between adjacent notches 51 and thereby engage successive notches 51. Thus, an intermittent drive is provided for the chain 44, moving the upper flight of chain 44 from left to right in FIG. 1.

Below the chain 44 and adjacent one side of the machine is a power shaft 58 which extends substantially the entire length of the frame 20 and is journaled by bearings 59 which, in turn, are supported by the legs 10, 223 and 11 and upright 14. The outer end of shaft 58 is provided with a beveled gear 60, seen best in FIG. 14. The beveled gear 60 meshes with a beveled gear 60′ fixed on shaft 56. Inwardly of the shaft 56, the shaft 58 is provided with a sprocket 61, as seen in FIG. 1, around which extends a chain drive 62 which, in turn, is driven by a motor 63. When the machine is operating, the shaft 58 is rotated continuously by motor 63 and, therefore, rotates shaft 56 continuously to impart the intermittent drive to the chain 44.

As mentioned above, there are a number of stations or zones along the length of the machine. These stations include a tray receiving station 370 inwardly adjacent the entrance end of the machine; a cup receiving station 380 inwardly of the tray receiving station 370; a cup filling station 390 in the central portion of the machine; a sheet supporting station 400 following the cup filling station 390; a sheet sealing station 410 following the sheet supporting station 400; a longitudinal severing or slitting station 420 following the sheet sealing station 410; a transverse severing station 430 inwardly adjacent the exit end of the machine and a tray discharge station denoted generally by numeral 440, extending to the exit end of the machine.

In the tray receiving station 370, the trays 28 are manually, successively inserted between the guides 24 so that intermediate portions of their bottom sheets 29 rest upon bars 23 and each lug 45 engages a tray 28 for moving it from left to right in FIG. 1. The space between the adjacent lugs 45 is so correlated with the length of the tray 28 that the rearmost transverse row of holes 35 in one tray is spaced from the frontmost transverse row of holes 35 of the next adjacent tray by a distance equal to, or approximately equal to, the distance between adjacent transverse rows in each tray 28. Hence, all holes 35 in the procession of trays 28 which are moved through the machine by the lugs 45 are equally spaced apart. Furthermore, the distance which the chain 44 is moved in each cycle of the machine, i.e., the distance moved when the pawl 52 is shifted from one notch 51 to the next notch 51 and is returned to its original position, is equal to the distance between the centers longitudinally of the holes 35 in the tray.

CUP MAGAZINE

Figure 2:
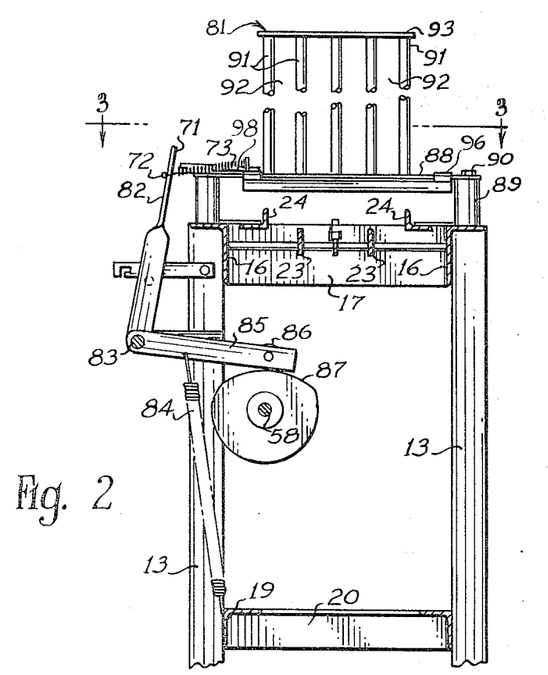
FIG. 2 is a cross sectional view taken substantially along line 2—2 in FIG. 1.
Figure 3:
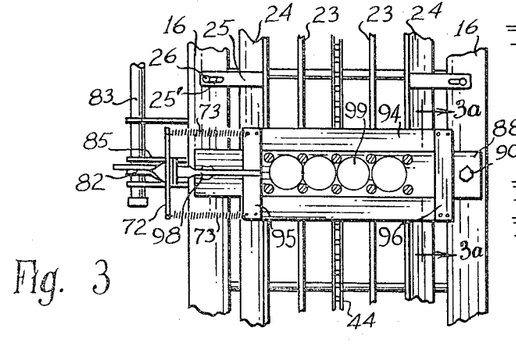
FIG. 3 is a cross sectional view taken substantially along line 3—3 in FIG. 2.
Figure 3A:
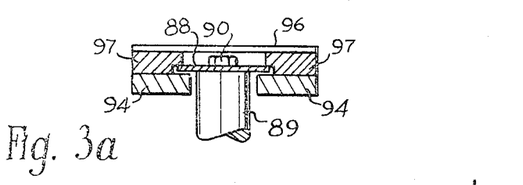
FIG. 3a is a cross-sectional view taken substantially along the line 3a—3a in FIG. 3.
Figure 4:
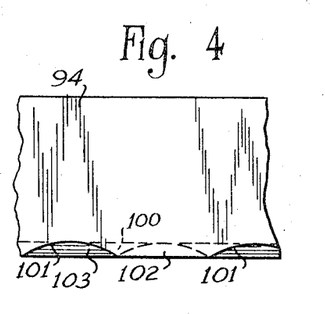
FIG. 4 is a fragmentary plan view, on an enlarged scale, of the slide bar of the cup dispensing mechanism shown in FIGS. 2 and 3.
Figure 5:
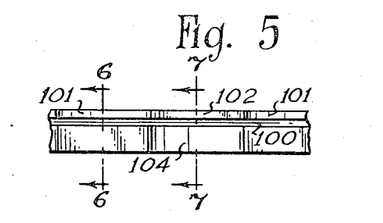
FIG. 5 is a side elevational view of that portion of the machine shown in FIG. 4.

From the tray receiving station 370, successive trays 28 are moved to the cup receiving station 380. At the cup receiving station 380 is disposed a cup magazine denoted generally by numeral 81 as best seen in FIG. 2. The mechanism for actuating the cup magazine from the shaft 58 includes an upwardly extending lever arm 82 the lower end of which is pivotally carried by a pivot shaft 83 supported by uprights 12 and 13. Fixed to the lower end of arm 82 and also pivotally carried by the shaft 83 are a pair of parallel inwardly extending rocker arms 85, the inner ends of which support a cam follower roller 86 riding on a cam 87 mounted on shaft 58. Roller 86 is urged against cam 87 by a spring 84 extending from bar 19 to arm 85. The lever arm 82 and rocker arms 85, therefore, form a bell crank whereby the rotation of shaft 58, moves the arm 82 inwardly and outwardly in timed relationship to the movement of the trays 28 by the lugs 45. The upper end of arm 82 is flattened, as illustrated in numeral 71, and is provided with a crossbar 72.

Adjacent the end 71 of arm 82 is a flat stationary base plate or lower plate 88, which extends transversely across the machine and is supported in a horizontal position on a pair of blocks 89 mounted respectively on the flanges of bars 16. Thus, base plate 88 is disposed in a fixed position in spaced relationship above the path of travel of trays 28. Bolts, such as bolts 90, extend through the ends of a lower plate 88 and through the blocks 89 for securing the plate 88 to the beams 16.

Plate 88 is provided with a plurality of equally spaced holes 99 which are of a diameter larger than the diameter of a cup flange 43. These holes 99 are spaced transversely so as to be in longitudinal alignment with the holes 35 of the trays 28 as the trays 28 pass beneath the plate 88. A plurality of upstanding rods 91 are mounted on plate 88 so as to define, therebetween, a plurality of cup receiving chutes 92 in vertical alignment with holes 99 in plate 88. An upper plate 93 is mounted on the ends of the rods 91 parallel to plate 88 and this plate 93, likewise, is provided with a plurality of holes (not shown) which are in vertical alignment with the holes 99 in plate 88. Thus, a plurality of nested cups 40 may be inserted through the holes in the top plate 93 and are retained within the chute 92, as will be explained more fully hereinafter. In this nested or stacked condition, the lips or rims 43 of cups 40 are aligned vertically and spaced equally from each other.

On opposite sides below the lower plate 88 are the cup release slide bars 94 which are adapted to slide transversely in conjunction with each other. The ends of bars 94 are joined by crossbars 95 and 96 which pass over the end portions of plate 88 and thereby hold the bars 94 in abutting relationship to the plate 88. Interposed between the bars 94 and the crossbars 95 and 96 are blocks 97 which space the crossbars 95 and 96 from the bars 94, providing recesses or slots which slidably receive the edges of the plate 88.

From the central portion of the crossbar 96, an actuator rod 98 extends toward the flattened end 71 of arm 82, the end of rod 98 being positioned for engagement by end 71. Springs 73 extending between crossbar 72 and crossbar 96 urge the end 71 and the end of rod 98 together. Thus, upon rotation of the shaft 58, the cam 87 will rock, via roller 86, the arms 85 and thereby rock the arm 82 back and forth, the arm 82 moving the springs 73 and actuator rod 98 backwardly and forwardly in a reciprocating movement to reciprocate the bars 94. The movement of the arm 82 away from the cup magazine is through only the springs 73, while the movement toward the cup magazine is assisted by the arm 82 engaging the outer end of the rod 98.

Figure 6:
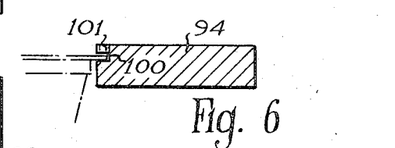
FIG. 6 is a cross-sectional view taken substantially along lines 6—6 in FIG. 5, a cup being illustrated adjacent the slide bar shown therein.

As best seen in FIGS. 4, 5, 6 and 7, the slide bars 94, along their inner edges are provided with opposed, rim receiving grooves 100 which extends throughout the entire length of each bar 94 and are adapted to receive and support cups 40 by their rims 43. Above the rim receiving groove 100 in each bar 94, are a plurality of opposed pairs of concaved, cup guiding or receiving recesses 101, the cup guiding recesses 101 being equally spaced from each other and of approximately the same diameter as the diameter of the holes in plates 88 and 93, such as holes 99. It is important that the cup receiving recesses 101 are of a diameter greater than the outside diameter of rims 43 and the space between the opposed surfaces of grooves 100 is greater than the outside diameter of rims 43 while the distance between the inner opposed edges of bars 94 is less than the outside diameter of rims 43 but greater than the largest diameter of the sides 42 of cups 40. It will be understood that the straight portions, i.e. the flanges 102 between adjacent recesses 101, on the inner edges of the upper surfaces of bars 94, are spaced apart by a distance less than the diameter of rims 43. Hence, each cup 40 may rest suspended between these opposed upper flanges 102 by its rim 43, when bars 94 are in their normal positions. When the bars 94 are slid transversely of the machine to move bars 94 to their shifted positions so as to bring the recesses 101 simultaneously into alignment respectively with the stacks of cups 40, the lowermost cup 40 in each stack will remain in its original position but will slide with respect to the bars 94 and be received in the space between the opposed recesses 101; the stacks of cups 40 then fall downwardly until, as seen in FIG. 6, the lowermost cup 40 in each stack is received on the shoulders 103 defined by the material of bars 94 which form the lower side of the rim receiving groove 100.

Between the rim receiving shoulders 103 and below the upper flanges 102 in each of the bars 94 are cup releasing recesses 104, all cup releasing recesses 104 being in opposed pairs and staggered with respect to the rim receiving recesses 101. The vertical distance, from the upper flanges 102 to shoulders 103 at the lower end of recesses 101, is less than the depth of the cups 40 and equal to or less than the distance between rims 43 of adjacent stacked cups 40 and hence, the cups 40 in each stack hold the lowermost cup 40 in vertical alignment with the stack throughout the dispensing operation.

Figure 7:
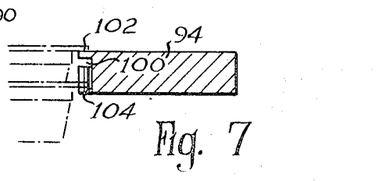
FIG. 7 is a cross-sectional view taken substantially along line 7—7 in FIG. 5 and showing a cup being released by the slide bar shown therein.
Figure 8:
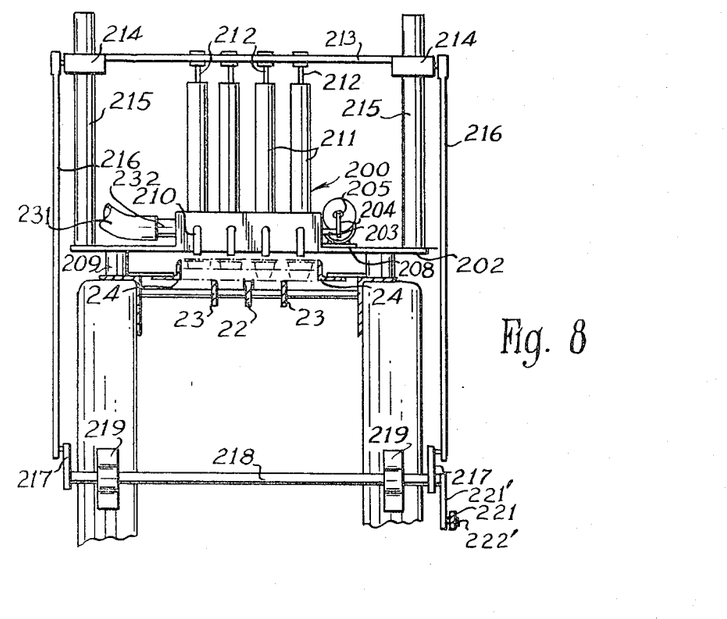
FIG. 8 is a cross-sectional view taken substantially along line 8—8 in FIG. 1.
Figure 9:
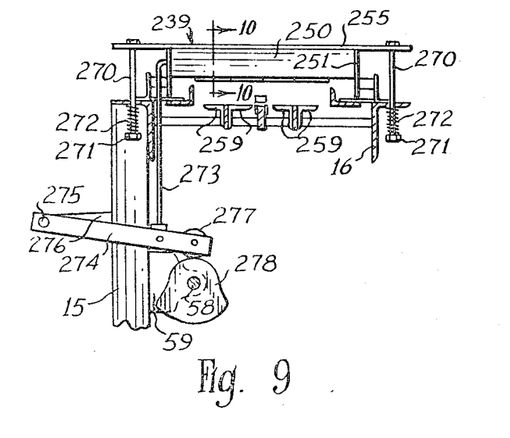
FIG. 9 is a cross-sectional view taken substantially along line 9—9 in FIG. 1.

As the bars 94 are moved sidewise from their shifted positions back to their normal positions, as seen in FIG. 7, the stacks of cups 40 still maintain the lowermost cups 40 in alignment with their stacks and, since the rims 43 of those cups 40 are now aligned with groove 100, as the bars 94 are moved laterally, the rim 43 of each lowermost cup 40 moves with respect to bars 94, via grooves 100, to the cup releasing recesses 104, when the lowermost cup 40 in each stack is released. At the same time, since the flange 102 between the recesses 101 are in vertical alignment with the cup releasing recesses 104, the cup next above the lowermost cup (which has been dropped) is received on the flanges 102.

It is now seen that upon each reciprocation of the bars 94 by the arm 82, the movement in one direction will cause alignment of cup receiving recesses 101 and shoulders 103 with the stacks of cups 40 and then the movement of bar 94 in the other direction will again align flanges 102 and the cup recesses 104 with the stacks of cups 40; this reciprocation will result in the lowermost cup 40 in each stack being dropped. The reciprocation of the arm 82 is so timed with the movement of the trays 28 that, as each group of the lowermost cups 40 is dropped, a tray 28 has been stopped with a new transverse group or row of holes 35 aligned vertically with the stacks of cups 40 and, therefore, the lowermost cups 40 fall into these holes 35. Thus, as the trays 28 are moved beneath the cup receiving zone 380, progressive transverse rows of cups 40 are deposited in the transverse row of holes 35 therein.

LIQUID DISPENSING MEMBER

The tray 28, after receiving a full load of cups, is moved to the cup filling station 390 where, the cups 40 in a transverse row simultaneously receive a prescribed amount of liquid. For accomplishing this, there is a liquid dispensing member denoted generally by numeral 200 and seen best in FIG. 8. This liquid dispensing member 200 includes a transversely disposed manifold 201 supported on a plate 202, the plate being mounted by blocks 209 on the beams 16 and so spaced from the chain 44 that the trays 28 may move beneath the plate 202. A plurality of valves (not shown) are provided in the manifold 201, the valves (not shown) being simultaneously rotated by means of a common shaft 203 and a rocker arm 204, the end of the rocker arm 204 being connected to a clevis 205 carried by the end of a piston rod 206. The piston rod 206 is reciprocated from a retracted position to an extended position by means of an air cylinder 207 which is pivotally mounted on an arm 208 projecting longitudinally from one end of plate 202.

A plurality of discharge spouts 210 extend from the manifold 201 outwardly and then downwardly, the inner ends of these spouts 210 communicating with the valves (not shown) which are actuated by the shaft 203. Also communicating with these valves (not shown) are a like number of metal syringe cylinders 211. The syringe cylinders 211 are upstanding members open at their upper ends and each is provided with a piston (not shown) to which is connected a rod 212, the upper end of all rods 212 being carried by a traveling block 213. The ends of the traveling block or bar 213 are carried by runners 214 which are slidably mounted upon upstanding standards 215. The standards 215 are carried respectively by the ends of the plate 202. Pivotally connected to the runners 214 are the pitmans 216, the lower end of which are pivotally connected to lever arms 217, the lever arms 217 being carried on the ends of a common shaft 218. The shaft 218 is carried by pillow blocks 219 which extend from legs 223 in the central portion of the machine. Another lever arm 221' extends downwardly from the shaft 218 and is provided with stub shaft 222' which is adjustable along the length of lever 221'. To stub shaft 221' is connected a link 221, the link 221 extending toward the exit end of the machine and being pivotally connected, as illustrated in FIG. 14, to a crank 222. The crank 222 is connected to the end of shaft 56 and, therefore, as the shaft 56 is rotated, the link 221 rocks shaft 218 so as to impart a reciprocatory movement, via lever arms 217, to the pitmans 216. This moves the runners 214 upwardly and downwardly on standards 215 and thereby imparts a reciprocatory movement to the piston rods 212.

The action of air cylinder 207 is timed with the action of the runners 214 whereby the valves (not shown) connected to the rod 203 open the manifold 201 to the syringe cylinders 211 when the pistons on piston rods 212 are lifted and open the syringe cylinders 211 to the discharge spouts 210 when the pistons connected to piston rods 212 are urged downwardly. Thus, the operation during each cycle includes the filling of each of the tubular syringe cylinders 211 with liquid from the manifold 201 and their subsequent discharge through the spouts 210, the discharge taking place while the trays 28 are stopped.

For feeding liquid to the manifold 201, there is provided a reservoir tank (not shown) which receives the liquid, the tank being connected at its bottom portion to a flexible tube 231 which leads to an intake pipe 232 which communicates with the manifold 201.

Cylinder 207 is a double acting type air cylinder which, when compressed air is supplied to the one end or the other, extends the piston rod 206 and retracts the piston rod 206. For actuating the cylinder 207, a compressed air line (not shown) is adapted to supply compressed air thereto. Interposed along the air line is a valve 234 having a lever 235 which is depressed for supplying compressed air to one side of cylinder 207 and a second lever 235' which is depressed for supplying air to the other side of cylinder 207. Cams 236, 236' are mounted for rotation with shaft 56 for respectively depressing levers 235, 235'. Thus, the rotation of shaft 56 causes cams 236, 236' to actuate levers 235, 235' respectively for reciprocating the piston rod 206 to extend piston rod 206 as piston rods 212 begin their down stroke and to retract piston rod 206 when piston rods 212 begin their upstroke.

The arrangement is such that as each transverse row of cups 40 is moved beneath the spouts 210, the material, i.e., liquid in the cylinders 211, is discharged through the spouts 210 into the cups 40 and the stroke of the piston rods 212 are so regulated that a single portion of the liquid is discharged to each of the cups 40 in the transverse row. In like manner, each subsequent row of cups 40 is filled.

FILM CARRIER

The tray 28 then moves through the sheet supporting station 400 to the film sealing station 410. At the sheet supporting station 400 are a pair of upstanding brackets 240 which are mounted respectively on the beams 16. The upper ends of the brackets are respectively provided with slots which open upwardly so as to receive a transverse shaft 241, the shaft 241 carrying a reel or roll 242 of heat sealable sheet or film material 249. Between the cup filling station 390 an the upright brackets 240 are a pair of upright brackets 245 on members 16 which journal a transversely extending rod 246. The rod 246, in turn, carries a pair of spaced opposed arms 247, the arms 247 being fixed for pivoting with the rod 246. The ends of arms 247, carry therebetween, a transverse tensioning roll 248, seen in FIG. 1. The sheet material 249 which extends from the roll 242 passes around the tensioning roll 248 and then extends toward the exit end of the machine, passing beneath the roll 242 and is held manually, at the beginning of the operation, over the first transverse row of cups 40 in tray 28 passing through the machine. Thus, as the trays 28 are moved progressively through the machine, the sheet material 249 is layed over the top of all cups 40 in those trays 28.

HEAT SEALING MEMBER

Figure 10:
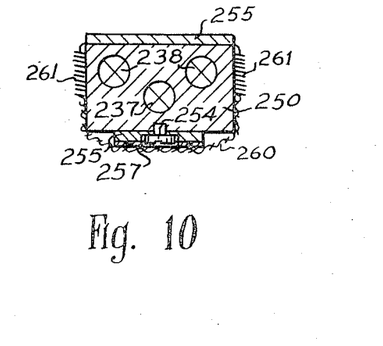
FIG. 10 is a cross-sectional view taken substantially along line 10—10 in FIG. 9.

The trays 28 then pass into the sealing station 410 where the heat sealable material 249 is sealed onto the upper flat surface of rims 43 of all cups 40 in the trays 28. To accomplish the heat sealing, I have provided a heat sealing member, denoted generally by numeral 239. The heat sealing member 239 includes a rectangular metal block 250, best seen in FIG. 10. The block 250 is provided with heating elements 238 and a thermostat 237 inserted in holes drilled in the ends of block 250. The block 250 has a flat bottom surface and extends transversely across the path of movement of the trays 28 and has aligned circular or disc shaped silicone rubber pads 257 along this bottom surface. The pads 257 are each provided with a central hole and are each secured to a surface of a metal disc 255. The metal disc 255, in turn, is bolted by means of a bolt 254 to the bottom surface of block 250.

Block 250 is supported, at its opposite ends, by the ends of parallel levers 251. The other ends of levers 251 are fixed on a shaft 252 which is journaled by bearings 254, the bearings 254 being mounted on the beams 16. The levers 251 extend toward the exit end of the machine and are, therefore, adapted to move the heating block 250 upward and away from the cups 40 on the trays. The heating block 250 is provided, along its upper surface, with a transverse bar 255 which extends beyond the levers 251 on both sides thereof.

Suitable electrical circuits (not shown), controlled by the thermostat 237, are provided, by means of which the heating elements 238 are heated.

Passing beneath the heating block 250 and pads 257 is a woven Teflon sheet 260, the ends of which are secured to springs 261 so that the sheet 260 is held against pads 257.

Pads 257 are of slightly larger diameter than the maximum diameter of rims 43, correspond in number to and are disposed in longitudinal alignment with the longitudinal rows of cups 40.

At this zone, flat anvil plates 259 mounted on bars 23 support the bottom of trays 28 to prevent downward movement of the cups when sealing pressure is applied to the tops of the cups 40. The heating block 250 is continuously urged downwardly by means of a spring mechanism which includes a pair of rods, such as rod 270, which extend through the end portions of bar 255, downwardly from the levers 251, so that the heads of rods 270 abut the bar 255. The rods, such as rod 270, project through an appropriate hole in the flanges of beams 16 and are respectively provided with nuts, such as nut 271, threadably engaging the ends of the rods 270. On each rod 270 is a spring 272 which urges the nut 271 downwardly, thereby urging the shaft 270 downwardly, the shaft 270, in turn, urging the levers 251 and the heating block 250 downwardly. Thus, normally, the pads 257 carried by the block 250 are simultaneously urged into flat engagement with the sheet material 249 above a transverse row of cups 40, so as to seal the sheet material 249 against the rims 43 of all of the cups in that transverse row.

The levers 251, however, are periodically lifted by means of a lift rod 273. The lift rod 273 extends vertically between beam 16 and guide bar 24 and its upper end is bent inwardly to provide a stub shaft which is pivotally journaled in a portion of one of levers 251. The lower end of lift rod 273 is pivotally connected to an intermediate portion of a lever arm 274. The outer end of the lever arm 274 journals a longitudinally extending shaft 275 which is supported adjacent one side of the machine by means of sidewise extending brackets 276 on uprights 14 and 15. The inner end of the lever arm 274 is provided with a cam follower roller 277 which rides upon a cam 278 on shaft 58.

Upon each cycle of the machine, the lift rod 273 is moved upwardly and downwardly by action of the cam 278 and, therefore, raises the heating block 250 and then permits the springs 272 to return the heating block 250 to a heat sealing position over the cups 40.

LONGITUDINAL SLITTERS

Figure 11:
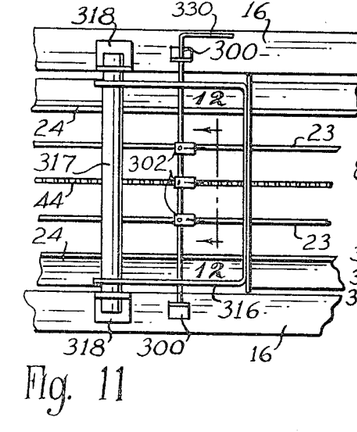
FIG. 11 is a cross-sectional view taken substantially along line 11—11 in FIG. 1.
Figure 12:
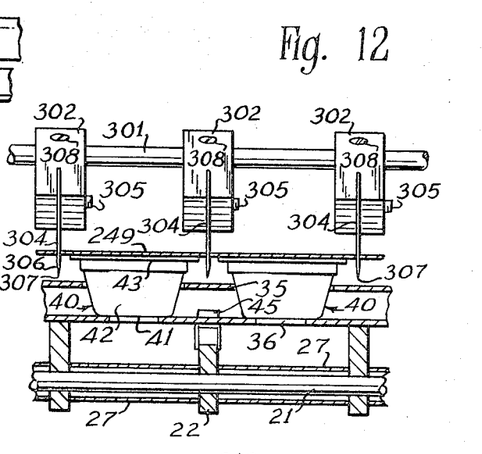
FIG. 12 is an enlarged fragmentary cross-sectional view taken substantially along line 12—12 in FIG. 11, and including a tray supporting a plurality of cups.
Figure 13:
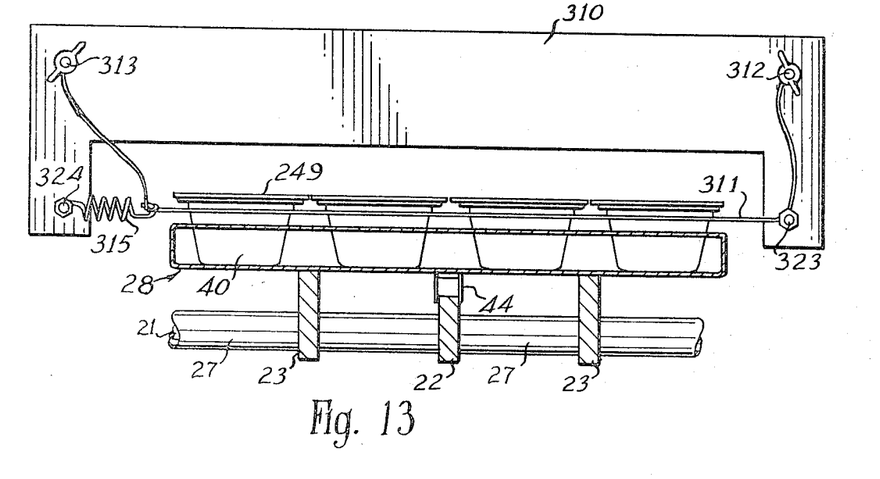
FIG. 13 is an enlarged fragmentary view of the end of the transverse severing mechanism of the machine shown in FIG. 1.

The cups 40, after being sealed, move next to the slitting station 420. At the slitting station 420, the film material 249, adhered to cups 40, is slit longitudinally between the longitudinal rows of cups 40. For this purpose, there are a pair of upstanding brackets 300, best seen in FIG. 11 which are mounted on the beams 16. These brackets 300 support, therebetween, a shaft 301, on which are carried a plurality of blade supporting blocks 302. The blade supporting blocks 302 are respectively provided with set screws 303 to make the blocks 308 relatively stationary and yet movable in the event that the blocks 302 need to be repositioned. Normally, however, the blocks 302 will remain in a single predetermined position.

The lower end of each block 302 is provided with a vertiual slot for receiving a razor blade 304 or some other knife means. The razor blade 304 is held in place by a set screw 305 which is threadedly carried by one side of the block 302, the end of the set screw 305 acting against the side of the razor blade 304. The blade 304 has cutting edges such as edge 306 which is adapted to slit the film material 249 passing beneath the block 302. The shaft 301 is journalled by brackets 300 and the end portion of shaft 301 is bent forwardly to provide a lever 330 the end of which normally rests upon beam 16. When the film material 249 is threaded into the machine, the lever 330 is lifted for lifting blades 304 out of position for engagement. Thereafter, the lever 330 is returned to the position shown in FIG. 11 to limit the extent to which the blades 304 project downwardly.

Preferably, the blocks 302 are inclined toward the exit end of the machine so as to support the blade 304 in an angular downwardly extending position inclined toward the exit end of the machine. The blocks 302 are spaced apart, transversely, so as to position each blade 304 in a position midway between the longitudinal rows of cups 40 in the trays 28.

The lower end 307 of all blades 304 terminates above the plane of the upper surface of the trays 28 but below the plane of the film material 249; hence, as each tray 28 is passed beneath the equally spaced longitudinally disposed knives or blades 304, the film material 249 is slit longitudinally to separate the film 249 into strips which correspond to the longitudinal rows of cups 40.

TRANSVERSE SEVERING MECHANISM

Next the film material 249 is to be cut or severed transversely. This is accomplished by heated electrical wire 311 which is reciprocated in essentially a vertical path and is disposed transversely over the path of movement of the trays 28. In more detail, the transverse severing mechanism, best seen in FIG. 13, and which is located at the transverse cutting station 430, includes an inverted U-shaped carrier bar 310, formed of electrically insulating material, the downwardly extending arms of which, have suspended, therebetween, the wire 311.

One end of wire 311 is connected to a terminal 312 and thence leads to and is wrapped around the bolt 323 on one side, while an intermediate portion of wire 311 on the other side is wrapped around one end of a spring 315, the other end of the spring 315 being connected to the screw 324. The end of wire 311 then leads to a terminal 313. Bolts 323 and 324 are positioned on opposite arms of carrier bar 310 and, thus, at all times, the wire 311 is maintained in tension and sufficient electrical current may be passed thereto from the terminals 312 and 313 to heat the wire 311 sufficiently that it will cut through the film material 249.

The carrier bar 310 is carried on the ends of a pair of parallel lever arms 316, the other ends of which are carried by a pivot bar 317. The ends of the pivot bar 317 are journalled by a pair of upstanding brackets 318 which extend from the beams 16. The weight of the carrier bar 310 is sufficient to urge the carrier bar 310 downwardly while a lift arm 319 is adapted to lift one of the lever arms 316. The brackets 318 are positioned between the brackets 300 and the sealing block 250. Thus, central portions of the lever arms 316 are recessed to provide downwardly opening notches 320 so that the lever arms 316 may pass over the shaft 301.

The upper end of lift rod 319 is bent inwardly and is journalled by one of the lever arms 316 adjacent the carrier bar 310. The lower end of rod 319 is pivotally carried by one of a pair of pivot arms 321 which, in turn, are pivotally carried by their outer ends on shaft 275. The inner ends of pivot arms 321 carry a roller (not shown) which rides on a cam 322 which is fixed on shaft 58.

OPERATION

Figure 15:
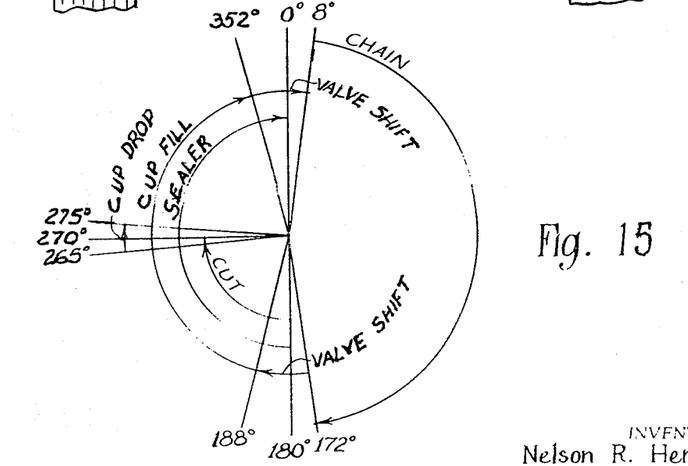
FIG. 15 is a diagram illustrating a typical cycle of the machine shown in FIG. 1.

From the foregoing description, the operation of the present invention should be apparent. First, the machine is actuated by energizing motor 63 so that the chain 62 rotates shaft 58 which, in turn, rotates shaft 56, as well as the cams, such as cams 87, 278, and 322. The shaft 56, upon rotation, rotates crank arms 55 and 222 so as to reciprocate pitman 54 and link 221. The link 221 rocks the shaft 218 backwardly and forwardly to move the runners 214 upwardly and downwardly. In FIG. 15, a cycle wheel is illustrated wherein it is shown that the chain 44 is driven during the first portion i.e., from 8° to 172° of the cycle of the machine. This is accomplished by means of the pawl 52 and ratchet wheel 50, the operation of which has been described herein before. Thus, during the first portion of the cycle, namely from 8° to 172° of the cycle of the present machine, the chain 44, via the lugs 45, move any trays 28 on the machine toward the exit end of the machine by a distance equal to the distance between the longitudinally adjacent holes 35.

As each lug 45 on the chain presents itself in the tray loading zone 370, the operator of the machine places a tray, such as the tray 28 illustrated in FIGS. 17 and 18, on the machine so that the edges of the tray 28 are between the guides 24 and rest upon bars 23 while a lug 45 engages the rear edge of the tray 28. In like manner a series of such trays 28 are positioned progressively on the machine as successive lugs 45 present themselves.

As the trays 28 are moved by the chain 44 intermittently, each successive transverse row of holes 35 in each tray 28 is successively positioned beneath the transversely aligned chutes 92 of the cup magazine or dispensing device 81. During the second portion of the cycle, namely from approximately 265° to 275° or, indeed, at any time during the latter half of the cycle, the cam 87 actuates, via the lever arm 82, the slide bars 94 so that the slide bars 94 are simultaneously reciprocated to move all the recesses 101 momentarily into alignment with the stacks of cups 40 within the chutes 92. This, as explained above, drops the bottommost cups 40 and, indeed the entire stack of cups so that the rim or lip 43 of the bottommost cup 40 rests upon the shoulders 103, as illustrated in FIG. 6. When the bars 94 are returned to their original positions, the stacks of cups 40 are again aligned with the shoulders 103 and with the recesses 104 by which the bottommost cup 40 in each stack of cups is dropped, as illustrated in FIG. 7. Thus, upon each cycle of the machine, a transverse row of the holes 35 in a tray 28 is filled with cups 40. With progressive cycles of the machine, successive transverse rows of holes 35 are filled with cups 40, the cups 40 resting upon the bottom sheet 29 of the tray 28 with their lips 43 standing slightly above the upper sheets 30 and 31 of the tray 28.

The liquid dispensing member 200 is so timed with the machine that the runners 214 are at bottom dead center when the cycle of the machine is at 0° or 360° and the runners 214 are at top dead center when the cycle is at 180°. From 180° to 360° the runners 314 are moving downwardly to discharge the material via spouts 210 and, between 0° and 180° of the cycle the runners 214 are moving upwardly to fill syringe cylinders 211 from the manifold 201. To accomplish this, cams 236, 236' are so arranged as to actuate valve 234 during the period from 172° to 188° and also during the period from 352° to 8° whereby the liquid control valves (not shown) operated by shaft 203, are open to the manifold 201 during the first half of the cycle and open to the spout 210 in the latter half of the cycle. Therefore, it is seen that the valves of shaft 203 are opened to the spouts 210 during a portion of the time when a suction is created on the syringe cylinder 211 to suck back any liquid in spouts 210 and prevent leaking of spouts 210. Also the valves of shaft 203 are opened to spouts 210 before the piston rods 212 begin their downward travel to prevent a pressure from being built up in cylinders 211 prior to discharge thereof.

When the machine has operated through a series of cycles, successive transverse rows of cups 40 in trays 28 are positioned beneath spouts 210, the trays 28 and cups 40 being stopped during the latter half of the cycle. During the latter half of each cycle, the spouts 210 discharge measured amounts of liquid to the cups 40 disposed transversely therebelow, the amount of liquid being determined by the stroke of runners 214 and the diameter of the cylinders 211, as well as when the valves operated by shaft 203 are shifted.

It will be observed that the bars 22 and 23 are transversely spaced so that the spouts 211 are vertically between these bars. If, through some inadvertence, a cup 40 is not positioned within the tray 28, the liquid intended for the cup 40 which was not present will simply flow through the opening 36 and between the bars 22 and 23, and into a suitable receptacle positioned therebeneath. The stream of the liquid, however, will not flow onto any of the mechanism or damage the tray 28. Thus, when the tray 28 is ready for stacking in a box, a mere replacement cup is required in the empty recess in the tray 28.

After the cups 40 are progressively filled, they travel after several cycles to the sealing station 410 where the sheet material 249 is manually held over the first cups 40 in the procession. The cam 278, during the period from approximately 180° to 360° permits the springs, such as spring 272 to urge the heating block 250 downwardly so as to place the Teflon sheet 260 over a transverse row of cups 40 with the silicone rubber discs, or pads 257 in registry, concentrically, with the cups 40. The pads 257 are of larger diameter than the rims 43 and are sufficiently flexible and resilient that they respectively overlap the entire peripheries of rims 43. Through the manipulation of the controls for thermostat 237, the appropriate temperature for the operation of the heating block 250 is arrived at and, therefore, heat sufficient to seal the film material 249 to rims 43 of all cups 40 in a transverse row of cups is supplied via heating block 250 through pads 257 and sheet 260 to rims 43. Hence, the cups 40 are progressively sealed, the heating block 250 being reciprocated once during each cycle of the machine.

It will be understood that once the end position of film material 249 is attached to the tops of the first transverse row of cups 40, the operation of the machine is automatic with respect to the film material 249, in that the film material 249 is progressively unreeled from reel 242 as the end position is progressively moved toward the exit end of the machine thereby progressively laying film material 249 over the top of subsequent cups 40 and beneath the heating block 250.

Next, the trays are moved beneath the slitters or knives 304 so that the film material 249 is progressively cut longitudinally by being moved beneath the knives, to separate sheet material 249 into longitudinal strips corresponding to the longitudinal rows of cups 40. Thereafter, when a tray 28 reaches the transverse severing station 430 and is stopped, the hot wire 311 is reciprocated downwardly and then upwardly by the action of the cam 322. The cam 322 is so dimensioned that, at bottom dead center, the hot wire 311 is slightly above the upper surface of the tray 28 but below the plane of the upper surfaces of rims 43 of the cups 40 carried by tray 28. Therefore, the hot wire 311 on its downward path passes between the transverse rows of cups 40 and then moves upwardly, only severing the film material 249. The actuation of the hot wire 311 is during the period of from 180° to 270° of the cycle of the machine.

Thereafter, the trays 28 are progressively moved to the exit of the machine where an operator removes the filled trays 28 and places them in a box or other receptacle for shipment. If any cups 40 are missing, the operator has a supply of filled and sealed cups to insert in the appropriate hole in the tray 28.

It will be obvious to those skilled in the art that many variations may be made in the embodiments here chosen for the purpose of illustrating the present invention without departing from the scope thereof as defined by the appended claims.

I claim:

1. In a machine of the class described, a cup depositing machine comprising a plurality of aligned cup chutes for supporting in vertical stacks cups having peripheral rims, the rims of adjacent cups being spaced apart in each stack, and a pair of opposed sidewise shiftable slide bars disposed beneath said chute, said slide bars having surfaces for arresting said rims, said slide bars being provided with opposed pairs of cup receiving recesses for alignment simultaneously with said chutes, said slide bars having opposed shoulders at the lower ends of said cup receiving recesses for arresting the downward movement of the bottommost cups in said stacks when said cup receiving recesses are aligned with said chutes, the distance from said surfaces to said shoulders being less than the distance between adjacent rims, said slide bars being provided with opposed cup discharge recesses offset with respect to said cup receiving recesses betwen which said cups may be discharged, said slide bars being provided with opposed grooves between said cup receiving recesses and said cup discharge recesses for permitting said bottommost cups to shift from said cup receiving recesses to said cup discharge recesses when said slide bars are shifted from their positions aligning said cup receiving recesses with said chutes to positions aligning said cup discharge recesses with said chutes.

2. An apparatus for filling and sealing cups comprising:
   (a) a conveyor for receiving and conveying cups along a path;
   (b) a cup magazine disposed over said path, said cup magazine including;
      (1) a plurality of vertically extending cup chutes adapted to receive and retain stacks of cups, said cup chutes being arranged transversely of said conveyor;
      (2) a cup separating means for separating the bottommost cup from each stack of cups while supporting the remainder of the stacks of cups, and;
      (3) a cup discharge means for supporting the separated cups in an intermediate position and subsequently discharging the separated cups from said intermediate position onto said conveyor;
   (c) a cup filling mechanism disposed over said path for filling the cups;
   (d) means for applying a heat sealable film material over the upper surface of the filled cups;
   (e) means for intermittently heat sealing said film material to said cups, and;
   (f) means for severing said heat sealed film material into portions individual to each of said cups.

3. The apparatus of claim 2 wherein the cups are arranged in longitudinal rows and said means for severing said film material includes at least one longitudinal severing member for slitting said film material between longitudinal rows of cups, said severing member being disposed along said path above said film material for simultaneously exerting a downward force on said film material during the severing operation to urge said film material and cups toward said conveyor.

4. The apparatus of claim 3 wherein the cups are also arranged in transverse rows and said means for severing said film material further includes a vertically movable transverse severing member for intermittently severing said film material between transverse rows of cups, said transverse severing means including an electrically heated wire, a spring means for resiliently holding said wire under tension, and means for vertically moving the transverse severing member in timed relationship with the movement of the cups on the conveyor.

5. A cup depositing device comprising:
   (a) at least one vertical cup chute for supporting a plurality of cups nested in each other in a vertical stack;
   (b) first means for separating the bottommost cup from the stack of cups while continuing to support the remainder of the stack of cups including a shoulder for supporting the stack of cups having a recess therethrough for passage of cups therethrough; and
   (c) second means for receiving said separated cup from said first means, temporarily supporting said cup in an intermediate position and subsequently discharging said cup from said intermediate position, said second means including a shoulder positioned a predetermined distance below said recess of said first means and having a recess positioned below said shoulder of said first means for discharge of cups therethrough, said shoulder of said second means effective to support the stack of cups as said stack drops through said recess of said first shoulder, and said shoulder of said first means effective to engage the stack of cups carried by said shoulder of said second means and separate the bottommost cup from said stack as said shoulder of said first means is moved adjacent said stack.

6. In a process of providing filled, sealed cups in a tray, the steps of arranging open ended cups nested one within the other in a vertical stack in a cup depositing zone, passing along a predetermined path past said cup depositing zone a tray having equally spaced recesses aligned with the path of movement of said tray, dropping the bottommost cup of said stack into an intermediate holding position while retaining the remaining cups of the stack in the depositing zone, subsequently moving the bottommost cup to a discharge position and dropping the bottommost cup into the first recess in said tray when the recess of said tray is in the cup depositing zone, sequentially dropping additional bottommost cups into successive recesses of said tray as said recesses move into the cup depositing zone, successively inserting material into the cups, and sealing the open ends of the filled cups.

References Cited
UNITED STATES PATENTS

| | | | |
|---|---|---|---|
| 1,913,743 | 6/1933 | Borchert | 53—282 X |
| 2,712,717 | 7/1955 | Keller | 53—184 X |
| 2,765,601 | 10/1956 | Anderson | 53—59 |
| 2,796,711 | 6/1957 | Rich | 53—281 X |
| 3,054,679 | 10/1962 | Bradford. | |
| 3,112,590 | 12/1963 | O'Brien | 53—282 |
| 3,135,077 | 6/1964 | Siegel et al. | 53—182 |

TRAVIS S. McGEHEE, *Primary Examiner.*